(12) United States Patent
Wang

(10) Patent No.: US 7,616,378 B2
(45) Date of Patent: Nov. 10, 2009

(54) DICHROIC BEAM SPLITTER AND RELATED APPARATUS AND METHODS

(75) Inventor: Yaujen Wang, Arcadia, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 219 days.

(21) Appl. No.: 11/130,608

(22) Filed: May 17, 2005

(65) Prior Publication Data

US 2006/0262406 A1 Nov. 23, 2006

(51) Int. Cl.
*G02B 27/10* (2006.01)
*G02B 27/14* (2006.01)
(52) U.S. Cl. .................... 359/618; 359/631; 359/637
(58) Field of Classification Search ................ 359/618, 359/859, 869, 351, 365, 366, 368, 630–639, 359/583, 831–839, 649, 731, 619, 727–730, 359/737; 345/156, 158, 166; 250/227.11; 398/82; 372/18, 21, 25, 70; 356/326, 328, 356/8, 16; 353/28, 69, 99; 348/55, 744, 348/E9.012, E9.141, E9.142; 355/53, 66, 355/67
See application file for complete search history.

(56) References Cited

U.S. PATENT DOCUMENTS

| | | | | |
|---|---|---|---|---|
| 3,125,623 A * | 3/1964 | Leitz et al | ............ | 356/8 |
| 4,240,707 A | 12/1980 | Wetherell et al. | ............ | 359/859 |
| 4,444,464 A * | 4/1984 | Minott | ............ | 359/583 |
| 4,993,796 A * | 2/1991 | Kapany et al. | ............ | 398/82 |
| 5,355,224 A * | 10/1994 | Wallace | ............ | 359/631 |
| 5,661,604 A * | 8/1997 | Kuba | ............ | 359/637 |
| 5,917,656 A * | 6/1999 | Hayakawa et al. | ............ | 359/637 |
| 5,966,216 A * | 10/1999 | Galburt et al. | ............ | 356/401 |
| 6,111,563 A * | 8/2000 | Hines | ............ | 345/166 |
| 6,147,807 A * | 11/2000 | Droessler et al. | ............ | 359/637 |
| 6,178,047 B1 * | 1/2001 | Cook | ............ | 359/634 |
| 6,344,846 B1 * | 2/2002 | Hines | ............ | 345/166 |
| 6,522,473 B2 * | 2/2003 | Takeyama | ............ | 359/631 |
| 6,567,223 B2 * | 5/2003 | Ludington | ............ | 359/811 |
| 6,917,425 B2 * | 7/2005 | Caruso et al. | ............ | 356/326 |
| 7,009,702 B2 * | 3/2006 | Caruso et al. | ............ | 356/326 |
| 7,262,919 B1 * | 8/2007 | Yamazaki et al. | ............ | 359/631 |

OTHER PUBLICATIONS

Martin, C. et al., "The Galaxy Evolution Explorer," Future EUV/UV and Visible Space Astrophysics Missions and Instrumentation, SPIE, vol. 4854, pp. 336-350, 2003.
Mercier, R. et al., "Aspherisation of the Galex Beam Splitter," Laboratoire Charles Fabry, Institut d'Optique Théorique et Appliquée, Centre Scientifique d'Orsay, B.P. 147, (France) pp. 1-10.
Rodgers, J.M., "Unobscured Mirror Designs," Optical Research Associates, International Optical Design Conference 2002, SPIE, vol. 4832, pp. 33-60, 2002.

* cited by examiner

*Primary Examiner*—Loha Ben

(57) ABSTRACT

Dichroic beam splitters having non-parallel entry and exit surfaces, reduced distance between such surfaces, and an aspherical exit surface can be advantageously used in dual channel optical systems, particularly when one channel is dedicated to infrared light and the other channel is dedicated to visible or near-infrared light.

15 Claims, 5 Drawing Sheets

DICHROIC BEAM SPLITTER AND RELATED APPARATUS AND METHODS

FIELD OF THE INVENTION

The present invention relates generally to dichroic beam splitters, more particularly to dichroic beam splitters used in dual-channel optical systems, and more particularly to dichroic beam splitters used in dual channel optical systems wherein one channel is an infrared channel and another channel is a visible or near-infrared channel.

BACKGROUND OF THE INVENTION

Numerous optical systems are used for observing a scene comprising light emitted and/or reflected from one or more target objects within the field of view of the optical system. Such optical systems typically re-direct light entering the system so as to form an image at one ore more points at which the image can be observed by an eye, or sensed by an optical sensor such as a charge coupled device (CCD).

U.S. Pat. No. 4,240,707 describes a three mirror all reflective optical system based on the classical Cooke triplet. The '707 apparatus is capable of having a moderate field of view (approximately eight to nine degrees) while still maintaining a good performance. The '707 un-obscured all reflected optical system is good for high transmission and off-axis stray light rejection for a single spectral band.

In some instances, it is desirable to observe a target object utilizing two spectral bands. Various approaches are known for achieving use of two spectral bands. Such dual channel approaches include (1) using two identical optical system, (2) implementing two relays behind an image plane, and (3) placing a dichroic beam splitter before the image plane.

Dichroic beam splitters are often used to split incident light into two separate spectral bands, a "pass band" which is transmitted through the beam splitter, and a "stop band" which is reflected by the beam splitter. By placing a dichroic beam splitter before the image plane of an optical system, light which would strike or pass through the plane first encounters the beam splitter. The beam splitter passes through/transmits a portion of that light, and reflects another portion of that light. The reflected portion is directed along a first path, the reflective channel, and the transmitted portion along a second path, the transmission channel. The light traveling through the reflective channel comprises light of a first spectral band (corresponding to the stop band of the beam splitter), and the light traveling through the transmission channel comprises light of a second spectral band (corresponding to the pass band of the beam splitter) that does not overlap the first spectral band.

Information on reflective mirror design can be found in the paper titled "Unobscured Mirror Designs", by J. Michael Rodgers [p. 33, SPIE vol. 4832 (2002)], herein incorporated by reference in its entirety.

SUMMARY OF THE INVENTION

The present invention is directed to dichroic beam splitters having non-parallel entry and exit surfaces, reduced distance between such surfaces, and an aspherical exit surface, and to related methods, and optical systems utilizing such beam splitters.

In an exemplary embodiment of the invention, an optical system comprises a dichroic beam splitter having a first surface opposite a second surface with the optical axis of the first surface being non-collinear with the optical axis of the second surface.

In another exemplary embodiment of the invention, a dichroic beam splitter comprises a planar entry surface, and an aspheric exit surface opposite the entry surface. The planar entry surface is tilted relative to the opposite aspheric exit surface.

In yet another exemplary embodiment of the invention, a method of forming a dichroic beam splitter comprises: (a) first determining a tilt angle which will minimize astigmatism effects on light passing through a dichroic beam splitter; and then (b) determining aspheric coefficients that will minimize astigmatism effects on light passing through the dichroic beam splitter if the beam splitter has an entry surface and an exit surface with the determined tilt angle; and then (c) forming a dichroic beam splitter having a tilt angle and aspheric coefficients substantially equal to the determined tilt angle and aspheric coefficients.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims.

In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

Figure 1:
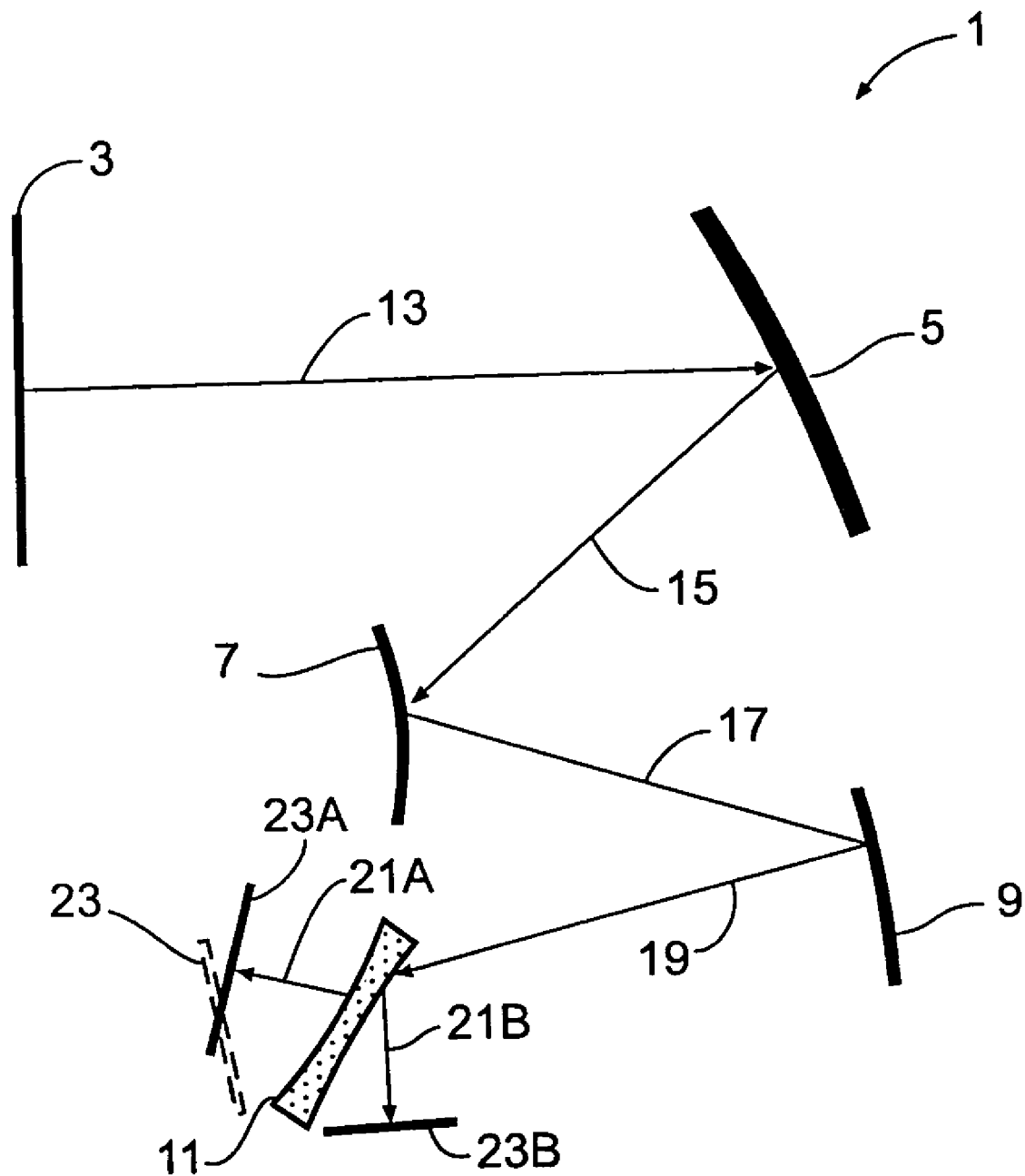
FIG. 1 is a schematic view of an optical system in accordance with an exemplary embodiment of the invention.

In FIG. 1, light beam 13 enters an optical system 1 through a window 3, is reflected as beam 15 by a primary mirror 5, then as beam 17 by a secondary mirror 7 which functions as the optical stop of the system, and then as beam 19 by a tertiary mirror 9. Beam 19 is then split on its way to an image plane 23 by a dichroic beam splitter 11 into component beams 21A and 21B directed respectively toward image planes 23A and 23B. In the embodiment shown, the beam 21A comprises visible and near-infrared light and will sometime be referred to herein as the VNIR channel, and the beam 21B comprises infrared light and will sometimes be referred to herein as the infrared channel. A VNIR image is formed at the image plane 23A, and an infrared image at the image plane 23B.

Figure 2:
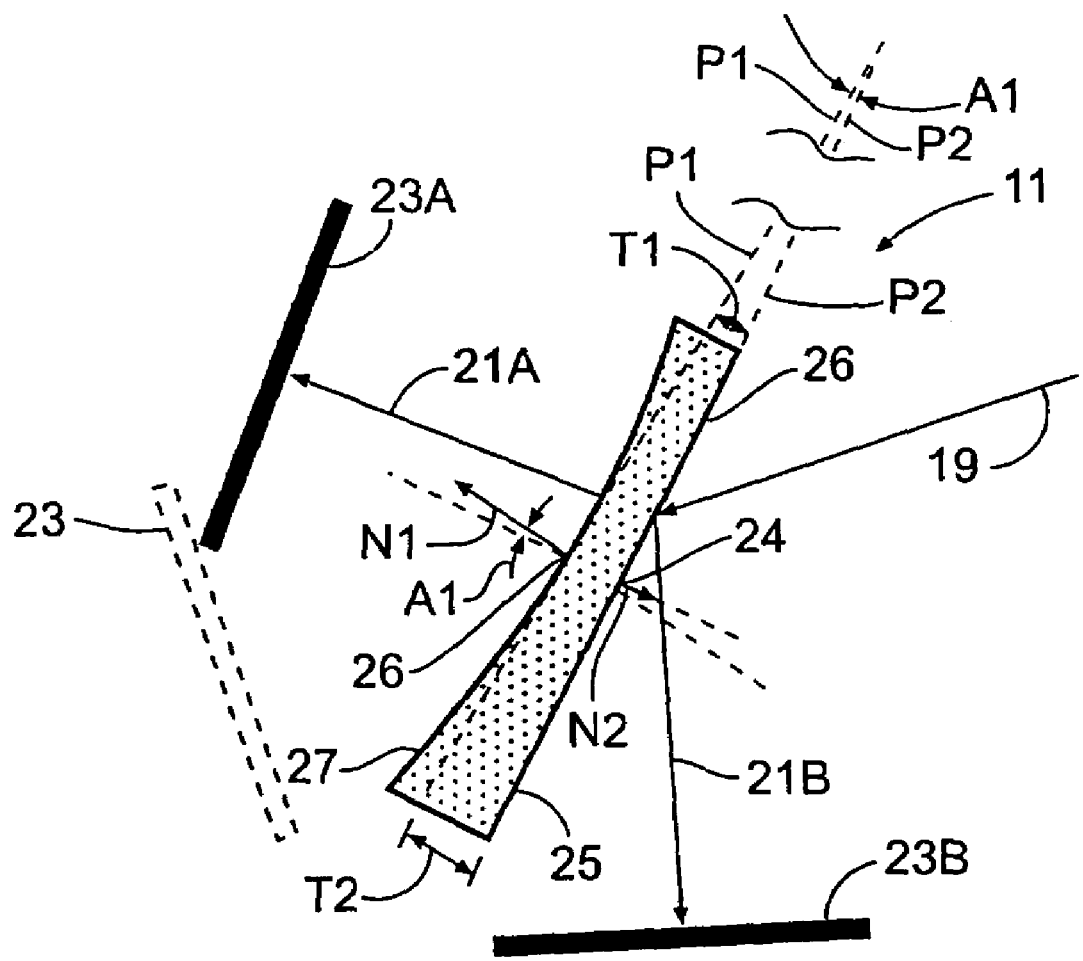
FIG. 2 is a schematic view of dichroic beam splitter in accordance with an exemplary embodiment of the invention.

In FIG. 2, the dichroic beam splitter 11 is shown in further detail, and comprises an entry/reflective surface 25, and exit surface 27. As is well known in the art, the entry surface 25 has a dichroic coating. An incoming light beam 19 is split into two component beams 21A and 21B. The exit surface 27 is radially symmetrical about the axis N1 with point 26 being its vertex/center point, and the entry surface 25 is radially symmetrical about the axis N2 with point 24 being its center point. The exit surface 27 is aspheric, and is formed such that it substantially conforms to a surface defined by the following equations, E1, E2, E3, E4, and E5:

$$z = \frac{cr^2}{1+\sqrt{1-(1+k)c^2r^2}} + Z_s\rho^4 + Z_a\rho_y'^2 + Z_c\rho^2\rho_y' \quad (E1)$$

$$\rho_x = \frac{x}{r_{max}} \quad (E2)$$

$$\rho_y = \frac{y}{r_{max}} \quad (E3)$$

$$\rho = \sqrt{\rho_x^2 + \rho_y^2} \quad (E4)$$

$$\rho_y' = \rho_y\cos\theta - \rho_x\sin\theta. \quad (E5)$$

In equations E1, E2 and E3, z is surface sag (deviation for the plane located perpendicular to the optical axis N1 at the vertex position of the surface), $r_{max}$ is the maximum radial aperture of the lens, defined by the semi-diameter value for the surface. In equation E1, the aspherical coefficients $Z_s$, $Z_a$, and $Z_c$ represent the amount of spherical aberration, astigmatism, and coma, respectively, in lens units at the maximum radial aperture $r_{max}$. The astigmatism and coma are oriented along a line that makes an angle θ in degrees with respect to the y axis. The x and y coordinates of equations E1-E5 are in a decentered and tilted coordinate system defined by the decenter x, decenter y, tilt about x, and tilt about y values. The aspherical coefficients $Z_s$, $Z_a$, and $Z_c$ for an embodiment of the dichroic beam splitter 11 will generally be obtained using optical design software known in the art in conjunction with the criteria for dichroic beam splitters described herein.

It has been found that if the entry and exit surfaces 25 and 27 are planar and parallel, the reflected/infrared channel has good performance, but the beam going through the beam splitter 11 suffers a great deal of image quality degradation related at least in part due to aberrations caused by a converging beam going through a plane-parallel plate with a finite thickness. Such aberrations may be mainly due to astigmatism plus a smaller amount of coma and spherical aberration.

To improve VNIR image quality, the surface 27 is tilted relative to the surface 25, the surface 27 is made aspheric, and chromatic aberrations are reduced by decreasing the beam splitter thickness and using a material having reduced dispersive power as the beam splitter substrate.

If the special higher order aspherical coefficients $Z_s$, $Z_a$, and $Z_c$ of equation E1 are set to zero, the surface 27 would be substantially planar. It is contemplated that it is advantageous if the surface 27 is tilted relative to the surface 25 such that, if the surface 27 were planar and lying on plane P1, and the surface 25 was lying on plane P2, at the line of intersection of planes P1 and P2 the planes would form a surface tilt angle A1. Alternatively, if the surface 27 is radially symmetrical about an optical axis N1, and the surface 25 is optically symmetrical about an optical axis N2, the angle A1 is the minimum angle through which N1 must be rotated to be collinear with N2.

Making the beam splitter wedge shaped (tilting surface 27 relative to surface 25) can compensate for a significant portion of any astigmatism created while the VNIR portion of the converging beam 19 passes through the beam splitter 11. Making the beam splitter wedge shaped can also reduce any ghost reflection and etalon effects that might occur if the surfaces 25 and 27 were parallel to each other.

In addition to improving image quality, tilting the surface 25 relative to the surface 27 also effects the position and/or orientation of the image plane. Referring to FIG. 1, the image plane 23 shows an orientation of an image plane that might exist if the beam splitter 11 were absent, while the image plane 23A shows the VNIR image plane. As can be seen, the plane 23A is tilted relative to the image plane 23. This provides a mechanism for "fine tuning" the performance of a three mirror tilted and de-centered optical system.

In addition to tilting the surface 27 relative to the surface 25, it is also advantageous to make the surface 27 aspherical. Causing the surface 27 to substantially conform to the surface defined by the equation E1, astigmatism and coma effects are further nullified. It is contemplated that in some instance the aspheric coefficients $Z_s$, $Z_a$, and $Z_c$ may have different values depending on the aberrations cascaded over from the fore-optics such as the window 3 and/or mirrors 5, 7, and 9.

The angle A1 and aspherical coefficients $Z_s$, $Z_a$, and $Z_c$ can be obtained by optimizing a merit function that incorporates the effects of the angle A1 and the aspherical coefficients on aberration, astigmatism, coma. Optimization is facilitated by incorporating the merit function in optical design software so as to automate the process of determining how combinations of different angles A1 and aspherical coefficients $Z_s$, $Z_a$, and $Z_c$ impact aberration, astigmatism, coma. The angle A1 is preferably determined by optimization of the merit functions in the optical design software to minimize astigmatism. The aspheric coefficients $Z_s$, $Z_a$, and $Z_c$ may be determined by optimization of the merit functions in the optical design software mainly to minimize the residual astigmatism after the angle A1 has been determined, and to reduce coma and spherical aberrations.

In addition to tilting surface 27, and making it aspheric, it is contemplated that decreasing the thickness (i.e. decreasing T1 and T2) of the beam splitter 11, and causing the beam splitter to have a lower dispersive power (possibly by selecting an appropriate material or combination of materials to use in forming the beam splitter 11) will decrease the effects of chromatic aberrations.

The thickness T1 is determined by mechanical strength requirement. In general the ratio of the length and width of the beam splitter and thickness shall be greater than 6 or 10. The difference between T1 and T2 forms the wedge angle A1 previously discussed.

For a given broad spectral bandwidth of interest, a low dispersive glass will be selected as the beam splitter material to minimize the chromatic aberration. In some visible light applications, the material will be Schott Glass BK7. An example of dispersion can be found by holding a wedge prism and looking into the Sun. By doing so, a rainbow can be formed. If a lower dispersion material is used for the prism, after diffracting through the wedge prism the diffracting angle of each color has less difference than it would if a higher dispersion material was used for the prism.

All reflective image optical (including IR) dual channel systems will benefit from the use of the a dichroic beam splitter as described herein in regard to beam splitter 11. Use of such a beam splitter will generally be advantageous as allowing a less complex and/or reduced size beam splitter, and providing improved performance. Examples of such systems are shown in FIGS. 3-5.

Figure 3:
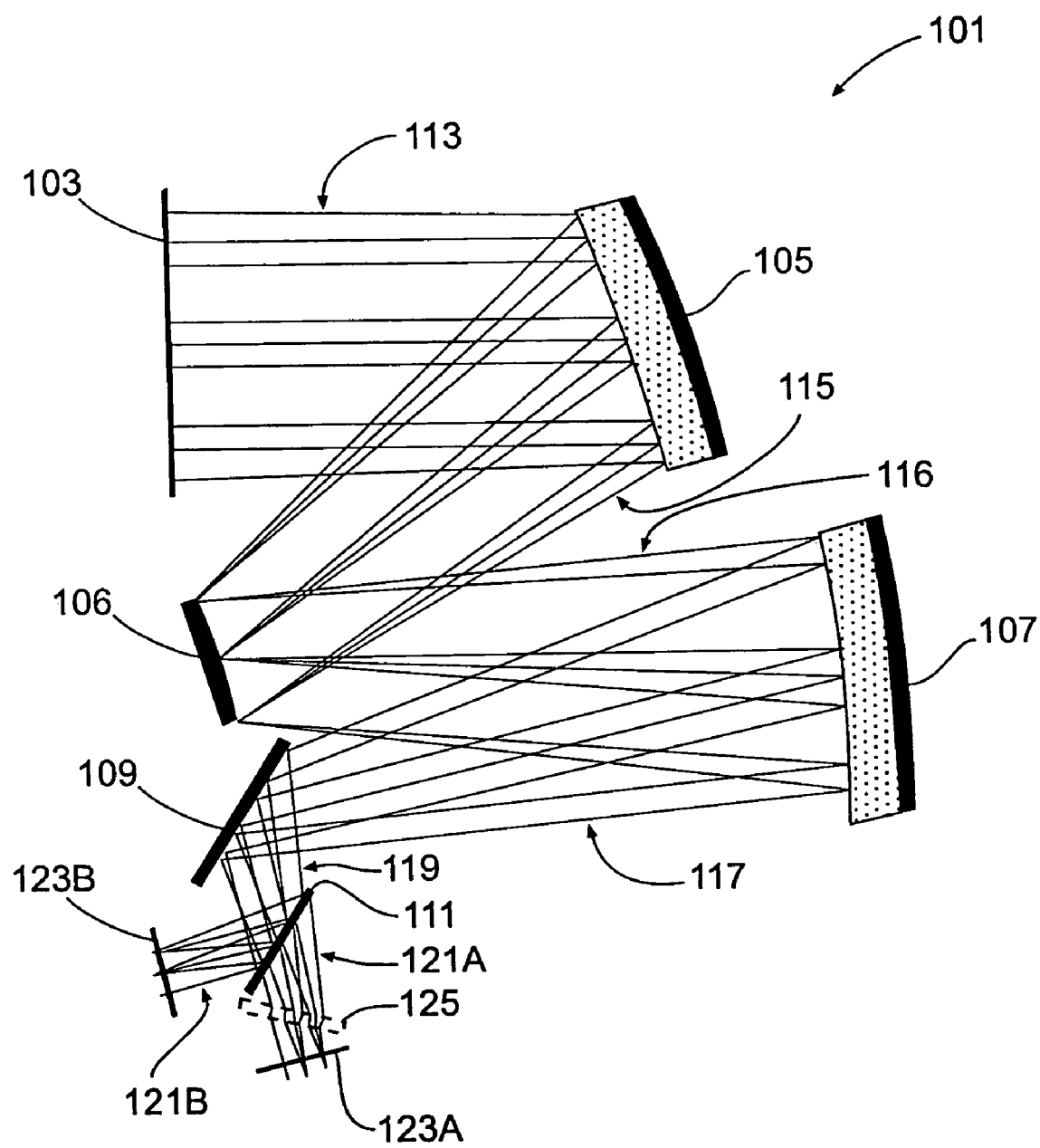
FIG. 3 is a schematic view of a three mirror reflective optical system in accordance with an exemplary embodiment of the invention.

In FIG. 3, a three mirror reflective (TMR) optical system 101 suitable for use in remote sensing and surveillance is shown. In FIG. 3, light beam 113 enters the optical system 101 through a window 103, is reflected as beam 115 by a primary mirror 105, then as beam 116 by a secondary mirror 106, as beam 117 by a tertiary mirror 107, and then as beam 119 by mirror 109. The beam 119 is split on its way to a filter 123 by a dichroic beam splitter 111 into component beams 121A and 121B directed respectively toward filters 123A and 123B. In the embodiment shown, the beam 121A comprises visible and near-infrared light and will sometimes be referred to herein as the VNIR (visible and near infrared) channel, and the beam 121B comprises infrared light and will sometimes be referred to herein as the SWIR (short wave infrared) channel. A VNIR image is formed at the VNIR filter 123A, and an infrared image at the filter 123B. The system 101 may advantageously use a dichroic beam splitter as described herein in regard to the splitter 11 of FIGS. 1 and 2 as the splitter 111. Without such a beam splitter, the system 101 would likely need to include a SWIR compensator 125 to compensate part of the astigmatism introduced by the beam splitter.

The system 101 has a stop at the secondary mirror 106, and has tilt and decentered and higher order aspheric coefficient in each mirror 105, 106, and 107 to balance and minimize aberration to achieve good imaging performance in a single channel. This kind of unobscured optical system supplies more photons than an obscured one, such as a (RC) Ritchey-Chretien optical system as used in the Space Telescope, and has a wider field of view.

Figure 4:
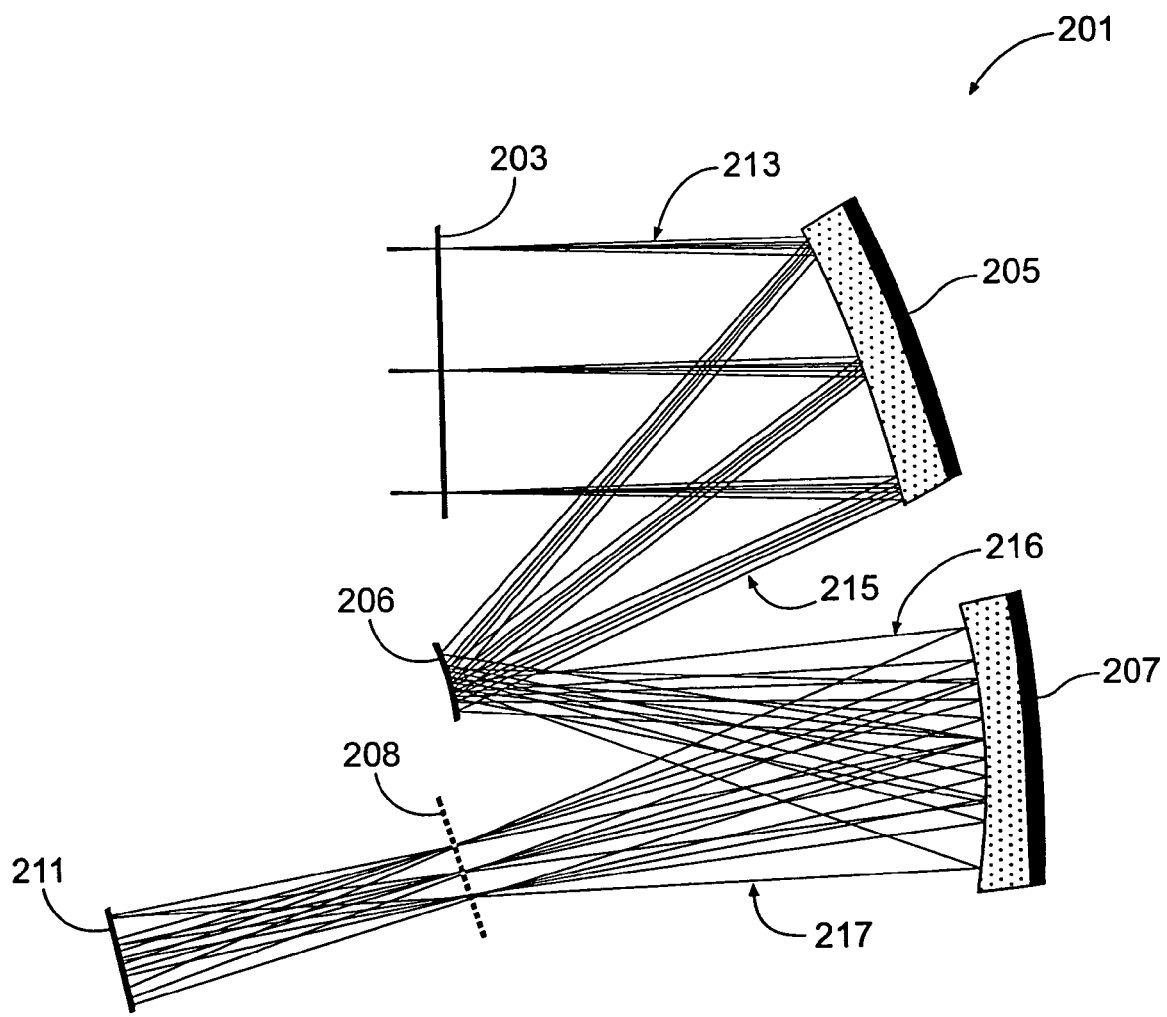
FIG. 4 is a schematic view of a three mirror reflective optical system in accordance with an exemplary embodiment of the invention.
Figure 5:
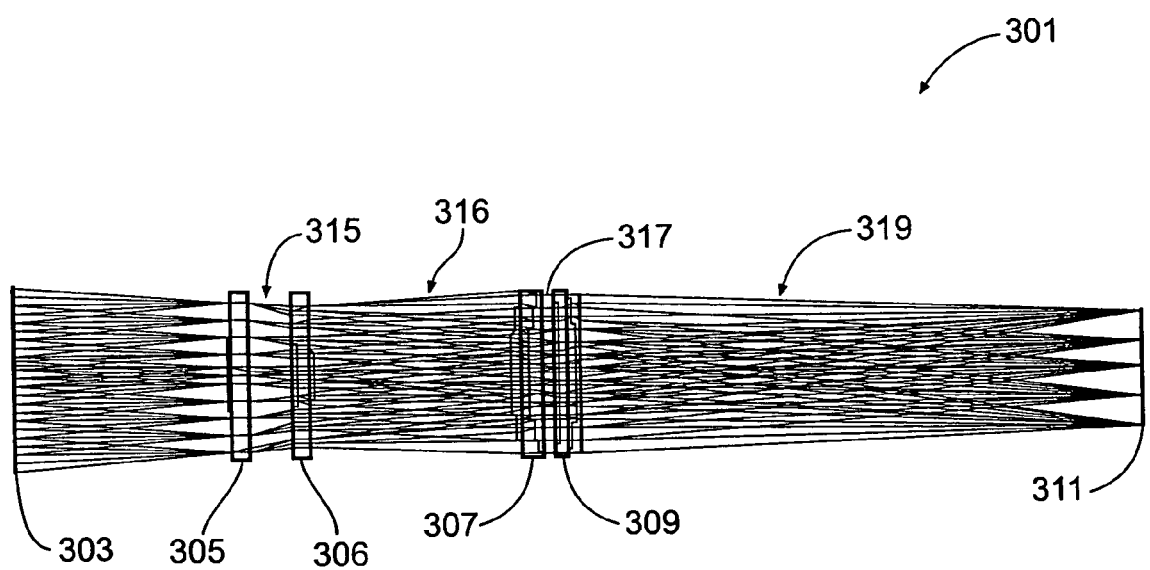
FIG. 5 is a schematic view of a three mirror reflective optical system in accordance with an exemplary embodiment of the invention.

In FIG. 4, another optical system 201 is a three-mirror anastigmat (TMA) system that has a smaller field of view than the TMR system 101 of FIG. 3. In FIG. 4, light beam 213 enters the optical system 201 through a window 203, is reflected as beam 215 by a primary mirror 205, then as beam 216 by a secondary mirror 206, as beam 217 by a tertiary mirror 207. The beam 217 is subsequently split by a dichroic beam splitter 211.

The TMA system 201 forms an intermediate focal plane 208 inside the three mirrors 205, 206, and 207 and has smaller field of view coverage than a TMR system. Thus, TMA systems such as system 201 offer a better stray light control than TMR systems. In contrast, TMR systems such as system 101 do not have an intermediate focal point, but have a bigger field of view. The system 201 may advantageously use a dichroic beam splitter as described herein in regard to the splitter 11 of FIGS. 1 and 2 as the splitter 211.

In FIG. 5, another optical system 301 is a refractive telescope. The refractive telescope 301 is similar to a TMR system, however, it utilizes refraction/transmission rather than reflection. An all reflective telescope is insensitive to color (chromatic) aberrations and has a better image quality in a higher\lower thermal environment than a refractive telescope. But, the refractive telescope is more compact and it is a rotational symmetrical system, which has less off-axis aberrations such as coma and astigmatism. The system 301 may advantageously use a dichroic beam splitter as described herein in regard to the splitter 11 of FIGS. 1 and 2 as the splitter 311. In FIG. 5, light beam 313 enters the optical system 301 through a window 303, is transmitted/refracted as beam 315 by lens 305, then as beam 316 by lens 306, as beam 317 by a lens 307, and then as beam 319 by lens 309. The beam 319 is then split by the dichroic beam splitter 311 into component beams.

From the forgoing, it should be apparent that a method of forming a dichroic beam splitter might include the following steps: (a) first determining a tilt angle which will minimize astigmatism effects on light passing through a dichroic beam splitter; and then (b) determining aspheric coefficients that will minimize astigmatism effects on light passing through the dichroic beam splitter if the beam splitter has an entry surface and an exit surface with the determined tilt angle; and then (c) forming a dichroic beam splitter having a tilt angle and aspheric coefficients substantially equal to the determined tilt angle and aspheric coefficients.

Such a method might be part of an automated process wherein characteristics of a material to be used to form a beam splitter are obtained and used to make the described determinations. In other instances, desired image characteristics might be used to select the material and/or dimensions of a dichroic beam splitter in addition to a tilt angle and aspheric coefficients.

What is claimed is:

1. An optical system having an optical axis comprising:
   a dichroic beam splitter having a light entry surface that reflects some of the incoming light and passes through the beam splitter some of the incoming light, and an aspheric exit surface opposite the light entry surface, with the optical axis of the exit surface being tilted with respect to the optical axis of the entry surface and decentered with respect to the optical axis of the optical system.

2. The optical system of claim 1 wherein the light entry surface of the dichroic beam splitter is substantially planar.

3. The optical system of claim 1 wherein the dichroic beam splitter receives incoming light from a three mirror reflective optical system.

4. The optical system of claim 3 wherein the dichroic beam splitter is positioned after a first mirror, a second mirror, and a third mirror in an optical path between an entry window and an optical sensor.

5. The optical system of claim 4 wherein the passed light consists essentially of visible and near infrared light, and the reflected light consists essentially of short wave infrared light.

6. An optical system comprising:
   a three-mirror anastigmat system; and
   a dichroic beam splitter having a light entry surface receiving incoming light from the anastigmat system, said entry surface reflecting some of the incoming light and passing through the beam splitter some of the incoming light; and the beam splitter further having an aspheric exit surface opposite the light entry surface with the optical axis of the exit surface being non-collinear with the optical axis of the entry surface.

7. The optical system of claim 6 wherein the passed light consists essentially of visible and near infrared light, and the reflected light consists essentially of short wave infrared light.

8. An optical system comprising:
   a three-mirror refractive system; and
   a dichroic beam splitter having a light entry surface receiving incoming light from the three-mirror system, said entry surface reflecting some of the incoming light and passing through the beam splitter some of the incoming light; and the beam splitter further having an aspheric exit surface opposite the light entry surface with the optical axis of the exit surface being non-collinear with the optical axis of the entry surface.

9. The optical system of claim 8 wherein the dichroic beam splitter is positioned after a first mirror, a second mirror, and a third mirror in an optical path between an entry window and an optical sensor.

10. The optical system of claim 9 wherein the passed light consists essentially of visible and near infrared light, and the reflected light consists essentially of short wave infrared light.

11. A beam splitter comprising:
a planar light entry surface, having an optical axis, for receiving and reflecting some of the received light, and passing some of the received light; and
an aspheric exit surface, opposite the planar entry surface, the aspheric exit surface being tilted relative to the optical axis of the planar entry surface.

12. A method of forming a dichroic beam splitter comprising:
first determining a tilt angle which will minimize astigmatism effects on light passing through a dichroic beam splitter; and then
determining aspheric coefficients that will minimize astigmatism effects on light passing through the dichroic beam splitter if the beam splitter has an entry surface and an exit surface with the determined tilt angle; and then
forming a dichroic beam splitter having a tilt angle and aspheric coefficients substantially equal to the determined tilt angle and aspheric coefficients.

13. The method of claim 12 wherein the tilt angle and the aspheric coefficients are determined by optimizing a merit function that incorporates the effects of the tilt angle and the aspherical coefficients on aberration, astigmatism, coma.

14. The method of claim 13 wherein the tilt angle is determined by optimization of the merit functions by optical design software to minimize astigmatism.

15. The method of claim 14 wherein the aspheric coefficients are determined by optimization of the merit functions by optical design software to minimize any residual astigmatism after the tilt angle has been determined, and to minimize coma and spherical aberrations.

* * * * *

UNITED STATES PATENT AND TRADEMARK OFFICE
CERTIFICATE OF CORRECTION

PATENT NO. : 7,616,378 B2  
APPLICATION NO. : 11/130608  
DATED : November 10, 2009  
INVENTOR(S) : Yaujen Wang Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 351 days.

Signed and Sealed this

Nineteenth Day of October, 2010

David J. Kappos  
*Director of the United States Patent and Trademark Office*